(12) United States Patent
Satge et al.

(10) Patent No.: US 6,286,866 B1
(45) Date of Patent: Sep. 11, 2001

(54) METHOD OF FOLDING AN AIR-BAG AND AN AIR-BAG

(75) Inventors: Laurent Satge, Ramonville Saint Agne; Remi Baillivet, Dampierre en Bray; Jean-Marie Cruet, Saint Marcel., all of (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/367,705

(22) PCT Filed: Feb. 20, 1998

(86) PCT No.: PCT/SE98/00299
§ 371 Date: Feb. 22, 2000
§ 102(e) Date: Feb. 22, 2000

(87) PCT Pub. No.: WO98/36946
PCT Pub. Date: Aug. 27, 1998

(30) Foreign Application Priority Data

Feb. 20, 1997 (GB) .................................. 97035133

(51) Int. Cl.⁷ .................................................. B60R 21/16
(52) U.S. Cl. ..................... 280/743.1; 350/728.1; 350/731; 493/405
(58) Field of Search ............................. 280/728.1, 743.1, 280/731; 493/405

(56) References Cited

U.S. PATENT DOCUMENTS

| 5,398,968 | 3/1995 | Emambakhsh et al. . | |
| 5,425,551 | 6/1995 | Hawthorn . | |
| 5,492,367 | 2/1996 | Albright et al. . | |
| 5,498,023 | 3/1996 | Adams et al. . | |
| 5,823,567 | * 10/1998 | Behr et al. | 280/743.1 |
| 5,839,755 | * 11/1998 | Turnbull | 280/739 |
| 5,899,495 | * 5/1999 | Yamamoto et al. | 280/743.1 |
| 5,931,498 | * 8/1999 | Kashavaraj | 280/743.1 |

FOREIGN PATENT DOCUMENTS

| 4301906A1 | 8/1993 | (DE) . |
| 0712716A1 | 5/1996 | (EP) . |
| 0734911A1 | 10/1996 | (EP) . |
| 2271966A | 5/1994 | (GB) . |

* cited by examiner

Primary Examiner—Lanna Mai
Assistant Examiner—Toan C To
(74) Attorney, Agent, or Firm—Venable; Robert Kinberg

(57) ABSTRACT

A method of folding an air-bag is disclosed. The air-bag is initially located in a substantially flat condition. Two side portions of the air-bag are rolled inwardly towards the gas generator and are then folded back (9, 10) towards the centre of the air-bag, thus releasing tension in the upper layer of fabric between the two rolls. The rolled regions are then themselves rolled inwards form the opposed ends thereof and are again finally turned back, again to release any tension in the central region of the fabric. Consequently, the central region of the fabric, which is located opposite the gas generator, is slack, enabling that part of the fabric to move away from the gas generator relatively easily when the gas generator is activated.

3 Claims, 4 Drawing Sheets

METHOD OF FOLDING AN AIR-BAG AND AN AIR-BAG

CROSS REFERENCE TO RELATED APPLICATIONS

Not Applicable

BACKGROUND OF THE INVENTION

The present invention relates to a method of folding an air-bag, and more particularly relates to a method of folding an air-bag for use in a motor vehicle.

It has been proposed to provide an air-bag in a motor vehicle adapted to be inflated in the event that an accident should occur. The air-bag, when inflated, is located in front of an occupant of the vehicle in order to protect the occupant of the vehicle.

It is necessary to inflate the air-bag extremely swiftly once an accident situation occurs. In many prior proposed air-bags, as a consequence of this rapid inflation, the fabric forming the air-bag is given a very high acceleration, and the fabric can impinge upon the occupant of the vehicle, injuring the occupant of the vehicle.

It has been proposed to fold an air-bag by providing the air-bag with linear folds in one direction, in a concertina-fashion, and subsequently providing the bags with linear folds in a perpendicular direction. This can cause a very high internal pressure which can give part of the fabric of the bag a very high initial acceleration.

It has also been proposed to provide an air-bag with concentric circular folds, as in GBA-2,279.046. Such an arrangement may provide very easy unfolding of the bag, but nevertheless, the inflation characteristic is still less than totally desirable.

U.S. Pat. No. 5,425,551 discloses an arrangement in which an air-bag initially has peripheral side portions rolled or folded inwardly, to form two parallel rolls, and subsequently is rolled perpendicularly to the initial rolls or folds to provide two further inwardly directed rolls. The two further inwardly directed rolls may be positioned in front of the rest of the air-bag. Part of the air-bag adjacent the gas generator is untensioned in one direction, but is tensioned in the other direction. The rolled portions of the bag have to be ejected from the housing as the first stage in the inflation process.

BRIEF SUMMARY OF THE INVENTION

The present invention seeks to provide an improved method of folding an air-bag, so that the air-bag, when inflated, provides a desirable inflation characteristic.

According to this invention there is provided a method of folding an air-bag, the method comprising locating the bag in a substantially flat condition, the bag presenting a first layer of fabric, which is the layer of fabric adapted to contact the occupant of a vehicle on inflation of the air-bag, and a second layer of fabric, the second layer of fabric defining an aperture which is connected to, or which is adapted to be connected to, a gas generator, rolling or successively folding two side portions of the air-bag, back toward the aperture, the air-bag being rolled or folded away from the first layer of fabric and towards the second layer of fabric, the folded air-bag extending to two opposed sides of the said aperture in a direction parallel to the direction of the first folds, and then moving the rolled or folded side portions inwardly towards each other against the direction of rolling or folding, and subsequently rolling or folding the extending portions of the air-bag with folds perpendicular to said first rolls or folds, and then rolling or folding the portion of the air-bag to one side of the aperture away from the first layer of fabric, and rolling or folding the portion of the air-bag extending to the other side of the aperture, away from the first layer of fabric, and finally moving the thus-created rolls or folded portions inwardly towards each other against the direction of rolling or folding.

The invention also relates to an air-bag when folded by the method, and particularly relates to such an air-bag in combination with a gas generator.

BRIEF DESCRIPTION OF THE DRAWINGS

In order that the invention may be more readily understood, and so that further features thereof may be appreciated, the invention may now be described, by way of example, with reference to the accompanying drawings in which.

DETAILED DESCRIPTION OF THE INVENTION

Figure 1:
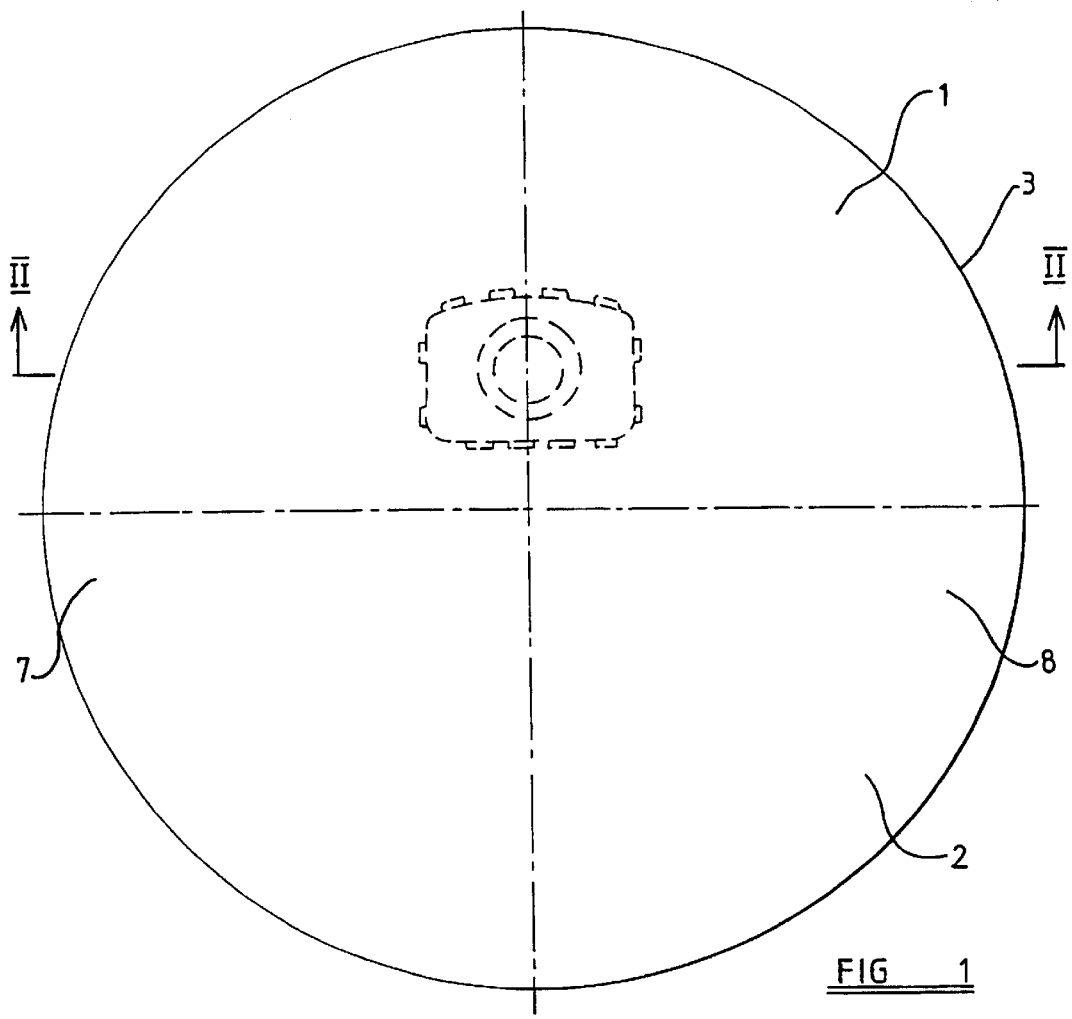
FIG. 1 is a plan view of an air-bag with gas generator prior to folding.
Figure 2:
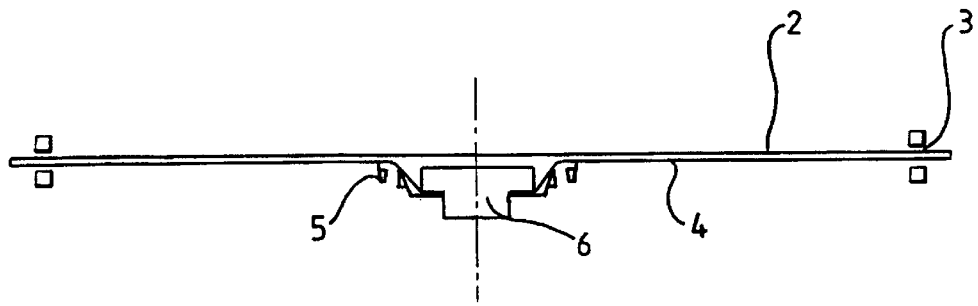
FIG. 2 is a sectional view taken on the line II—II of FIG. 1.

Referring initially to FIGS. 1 and 2 of the accompanying drawings, an air-bag 1 comprises an upper substantially circular layer of fabric 2, which is the part of the air-bag adapted to come into contact with an occupant of the vehicle. The outer periphery 3 of the circular upper layer of fabric 2 is connected, for example by a seam, to an underlying lower circular layer of fabric 4. The two layers of fabric 2,4 may alternatively be formed integrally.

The lower layer of fabric 4 defines an aperture 5 to which a gas generator 6 is connected. As can be seen from FIG. 1, the gas generator 6 is not centrally located within the lower sheet of fabric 4, but is slightly off-set from the center.

Figure 3:
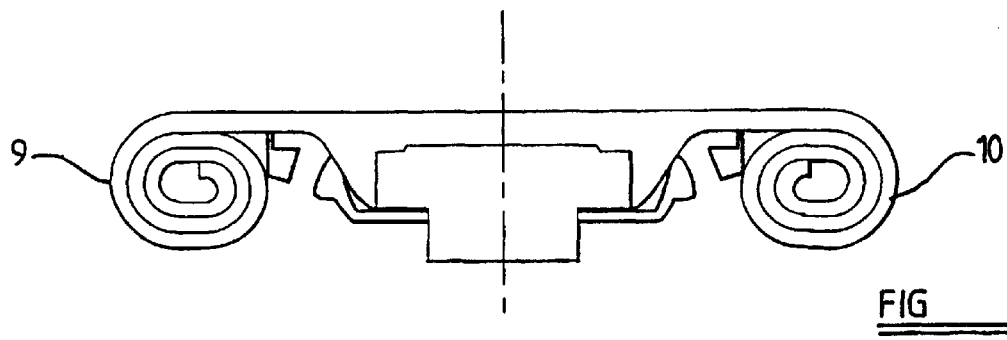
FIG. 3 is an enlarged view showing the bag when partially folded.

As an initial step in the folding process, two diametrically opposed side regions 7,8 of the air-bag are rolled or folded, with the said side regions of the air-bag being successively turned away from the upper layer of fabric 2 towards the lower layer of fabric 4, thus forming, as can be seen in FIG. 3, two rolls 9,10. Whilst the rolls are shown as being of a generally spiral form, the rolls may comprise successively folded flat regions.

Figure 4:
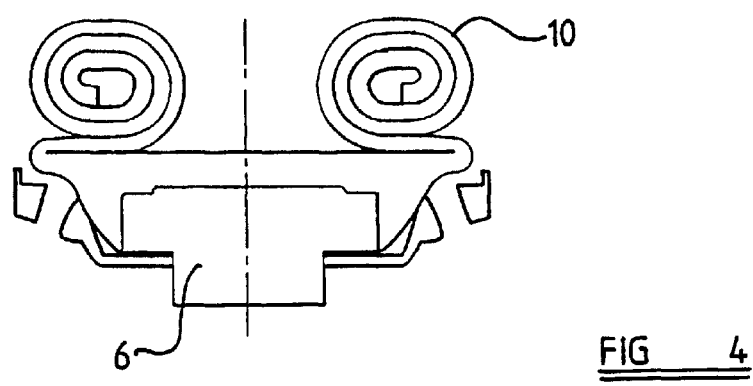
FIG. 4 is a view corresponding to FIG. 3 illustrating the bag at a subsequent stage during the folding process.

The rolls 9,10 are subsequently moved, as entities, to positions on top of the gas generator 6, as shown in FIG. 4. The rolls are thus moved against the direction of rolling or folding thus releasing any tension that there may be in the fabric between the rolls.

Figure 5:
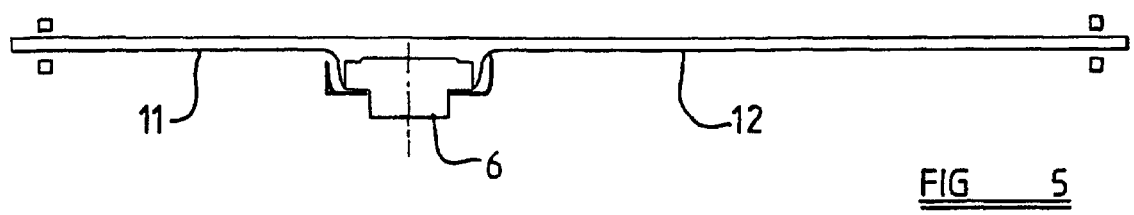
FIG. 5 is a view of the bag, in the condition illustrated in FIG. 4, taken generally on the line II—II of FIG. 1.

Since the air-bag has only been folded in one direction, with the folds extending parallel to a notional line which passes through the gas generator in the orientation shown in FIG. 1, in side view the air-bag has the condition illustrated in FIG. 5.

Figure 6:
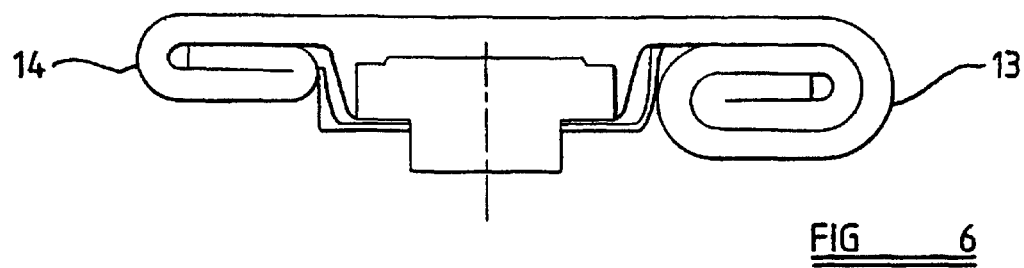
FIG. 6 is a view corresponding to FIG. 5, but showing the bag during a subsequent stage in the folding process.

The left-hand portion of the part-folded air-bag, that is to say the portion 11, illustrated in FIG. 6 is again folded, with this portion of the air-bag being successively folded away from the upper layer of fabric 2, and the right-hand portion of the air-bag, illustrated by reference numeral 12 in FIG. 5, is also folded, again being folded with successive folds directed away from the upper layer of fabric 2. Referring now to FIG. 6, the portion 11, when rolled, forms a roll 13, and the portion 12, when rolled, forms a roll 14.

Figure 7:
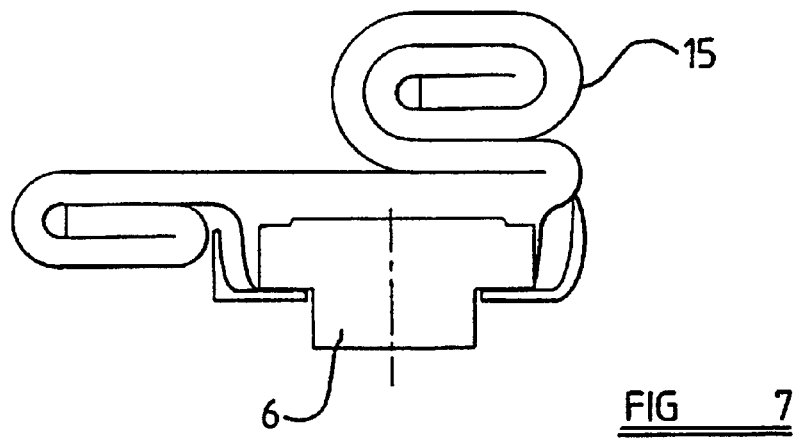
FIG. 7 is a view corresponding to FIG. 6 illustrating a further successive stage in the folding process.
Figure 8:
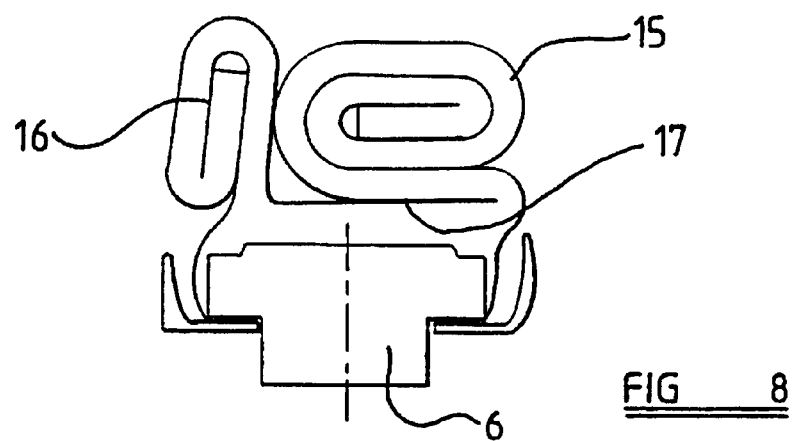
FIG. 8 is a view corresponding to FIG. 7 showing a further stage during the folding process.

Subsequently the roll 14 is folded inwardly to be located above the gas generator 6, as shown at position 15 in FIG. 7, and finally the roll 13 is moved to overlie the gas generator 6, occupying a position 16 adjacent the position 15 occupied by the roll 14. Thus, these rolls are also moved against the direction of rolling or folding, thus releasing any tension that there may be in the fabric 17 between thee rolls. The remaining unrolled area of fabric is thus loose and not tensioned.

Figure 9:
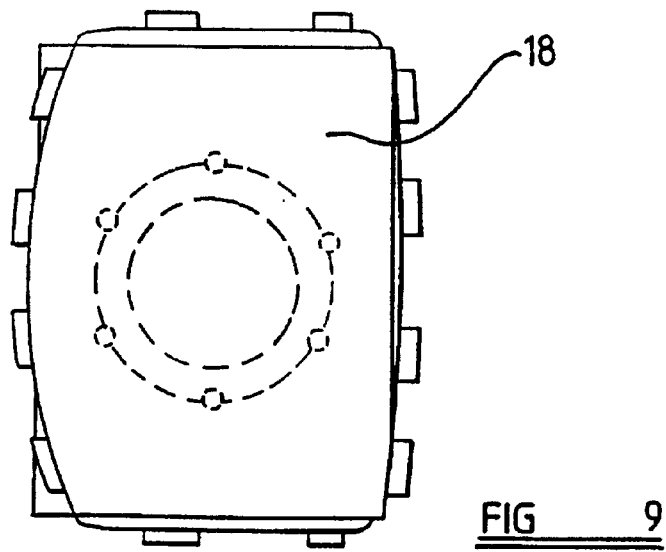
FIG. 9 is a view of a housing containing the folded air-bag.

The folded air-bag and the gas generator may be located within a housing 17 as illustrated in FIG. 9. The upper part of the housing may comprise one or more "doors" adapted to open on inflation of the air-bag in order to permit the air-bag to be inflated in a position in front of the occupant of the vehicle.

Figure 10:
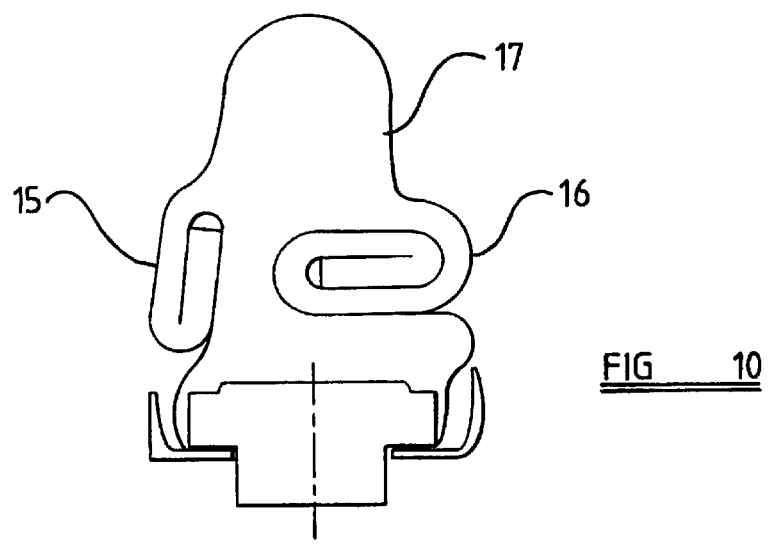
FIG. 10 is a view corresponding to FIG. 8 showing an initial stage in the inflation of the bag.
Figure 11:
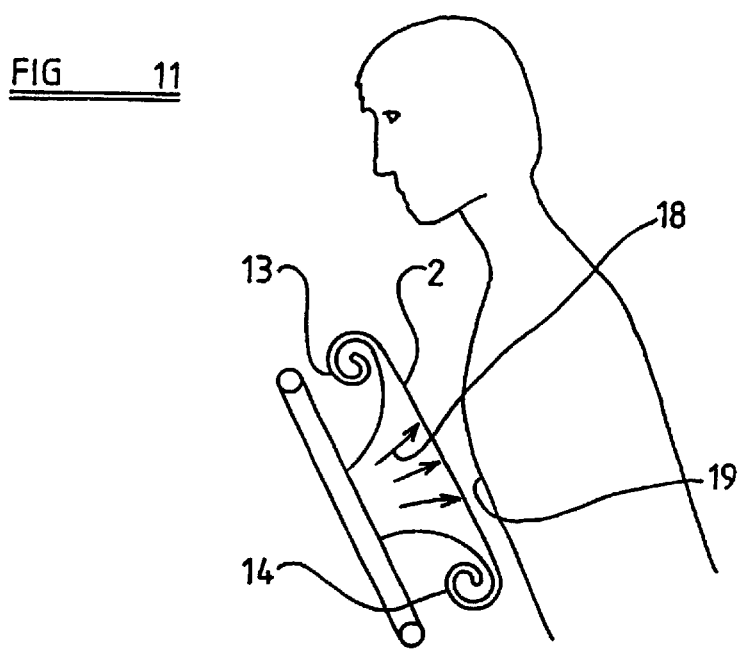
FIG. 11 illustrates an initial stage during inflation of the air-bag, as a side view.
Figure 12:
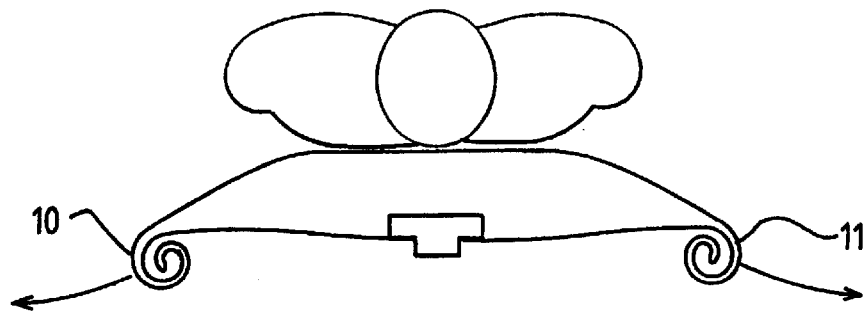
FIG. 12 illustrates a subsequent stage during the inflation of the air-bag as a top view.

Referring now to FIG. 10 of the accompanying drawings, should an accident arise, the gas generator will generate gas to inflate the air-bag. The gas from the gas generator initially passes to that part of the interior of the bag which is immediately adjacent the gas generator. Because the area of fabrics 17 remaining adjacent the gas generator 6 and between the various rolls described above is loose, as the gas is injected into the part of the interior of the air-bag immediately adjacent this portion of the fabric, this portion of fabric actually passes outwardly between the rolls 13 and 14 which still remain in the positions 15 and 16. The fabric 17 thus forms a "bubble" on the far side of the rolls in their positions 15,16 relative to the gas generator, and this "bubble" opens the door of the housing and commences inflation towards the passenger. Subsequently, the rolls move out of the housing. The portion of fabric 17 will then move outwardly in a direction indicated by the arrows 18 of FIG. 11 until the portion of fabric 17 impinges upon the chest 19 of the occupant of the vehicle. It can be seen that the rolls 13,14 unroll effectively towards the occupant of the vehicle, rather than rolling away from the occupant of the vehicle. Thus, one part 17 of the upper layer fabric 2 has contacted the occupant of the vehicle, there is no relative movement between the occupant of the vehicle and the layer of fabric. An increasing area of the layer of fabric is gradually brought into contact with the occupant of the vehicle, as the roll 13 unrolls upwardly and the roll 14 unrolls downwardly. Because of the off-set of the gas generator 6, the roll 14 is larger than the roll 13.

When the rolls 13, 14 have been unrolled, the air-bag extends from a position towards the lower part of the chest 19 of the occupant of the vehicle as far up as the head of the occupant of the vehicle, but does not have substantial width. Subsequently, the rolls 9 and 10 are un-rolled, as illustrated with reference to FIG. 11. As the rolls 10 and 11 unroll, again an increasing area of the upper layer 2 of fabric is brought into contact with the occupant of the vehicle. Again, the rolls unroll effectively towards the occupant of the vehicle so that again once the fabric has been brought into contact with the occupant of the vehicle, there is no relative movement between the fabric and the occupant of the vehicle.

It is to be appreciated that because the bag has been folded in such a way that the rolled parts of the bag are located "under" the bag, these rolled parts will not abrade the occupant of the vehicle as the rolled parts deploy on inflation of the bag. This not only minimizes the risk of injury to the occupant of the vehicle, but also ensures that the bag can deploy freely and that parts of the bag will not snag on the occupant, or the clothing of the occupant as the bag inflates.

It has been found that a bag folded as described above has a very desirable unfolding characteristic. During the initial stages of inflation of the bag, the bag can inflate easily, thus permitting the door or doors of the housing 17 to open easily and cleanly. Subsequently, the bag tends to resist unfolding, thus giving a relatively slow speed or velocity for the portion of the upper layer of fabric that is to contact the occupant of the bag. This minimizes the risk of injury occurring to the occupant who is to be restrained by the inflated bag. As the bag continues to inflate, inflation of the bag is not hampered by contact of the bag with the occupant of the vehicle and gradually an increasing area of the upper layer of the fabric of the bag is brought into contact with the occupant of the vehicle.

What is claimed is:

1. A method of folding an air-bag, the method comprising locating the bag in a substantially flat condition, the bag presenting a first layer of fabric, which is the layer of fabric adapted to contact the occupant of a vehicle on inflation of the air-bag, and a second layer of fabric, the second layer of fabric defining an aperture which is connected to, or which is adapted to be connected to, a gas generator, rolling or successively folding two side portions of the air-bag in a direction back toward the aperture, the air-bag being rolled or folded away from the first layer of fabric and towards the second layer of fabric, a portion of the folded air-bag extending on two opposed sides of said aperture in a direction parallel to the direction of the first folds, and then moving the rolled or folded side portions inwardly towards each other against the direction of rolling or folding, and then rolling or folding the portion of the folded air-bag extending to one side of the aperture away from the first layer of fabric, and rolling or folding the portion of the folded air-bag extending to the other side of the aperture, away from the first layer of fabric, and finally moving the thus-created rolls or folded portions inwardly towards each other against the direction of rolling or folding.

2. An air-bag produced by the following method steps: locating the bag in a substantially flat condition, the bag presenting a first layer of fabric, which is the layer of fabric adapted to contact the occupant of a vehicle on inflation of the air-bag, and a second layer of fabric, the second layer of fabric defining an aperture which is connected to, or which is adapted to be connected to, a gas generator, rolling or successively folding two side portions of the air-bag in a direction back toward the aperture, the air-bag being rolled or folded away from the first layer of fabric and towards the second layer of fabric, a portion of the folded air-bag extending on two opposed sides of said aperture in a direction parallel to the direction of the first folds, and then moving the rolled or folded side portions inwardly towards each other against the direction of rolling or folding, and then rolling or folding the portion of the folded air-bag extending to one side of the aperture away from the first layer of fabric, and rolling or folding the portion of the folded air-bag extending to the other side of the aperture, away from the first layer of fabric, and finally moving the thus-created rolls or folded portions inwardly towards each other against the direction of rolling or folding.

3. An air-bag according to claim 2 in combination with a gas generator.

* * * * *